United States Patent [19]

Iwasaki

[11] Patent Number: 5,394,310
[45] Date of Patent: Feb. 28, 1995

[54] VEHICULAR HEADLAMP HAVING UNIFORM APPEARANCE

[75] Inventor: Masahito Iwasaki, Shizuoka, Japan

[73] Assignee: Koito Manufacturing Co., Ltd., Tokyo, Japan

[21] Appl. No.: 217,702

[22] Filed: Mar. 25, 1994

[30] Foreign Application Priority Data

Mar. 26, 1993 [JP] Japan .................. 5-068053

[51] Int. Cl.⁶ .............................................. B60Q 1/04
[52] U.S. Cl. ........................................ 362/61; 362/243;
362/309; 362/332; 362/346
[58] Field of Search ................... 362/61, 80, 242, 243,
362/244–248, 308, 309, 328, 329, 331, 332, 344,
346, 297

[56] References Cited

U.S. PATENT DOCUMENTS

| | | | |
|---|---|---|---|
| 2,019,410 | 10/1935 | Hallman | 362/80 |
| 4,631,642 | 12/1986 | Brun | 362/61 |
| 4,949,226 | 8/1990 | Makita et al. | 362/61 |
| 5,047,903 | 9/1991 | Choji | 362/346 |
| 5,117,335 | 5/1992 | Yamada | 362/61 |
| 5,158,350 | 10/1992 | Sato | 362/61 |
| 5,172,972 | 12/1992 | Terao | 362/61 |
| 5,211,465 | 5/1993 | Suzuki | 362/61 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A vehicular headlamp which has a good uniformity of design and a good appearance when viewed from the front. A first lamp of the reflection type having a light source and a parabolic reflector circular when viewed from the front, and second and third lamps of the projection type having light sources, substantially elliptic reflectors, and projection lenses circular when viewed from the front, are horizontally arrayed. Profile lines, circular when seen from the front, are formed on a transparent front cover assembled over the front opening portion of the lamp body at positions corresponding to the three lamps and matching the circumferential profiles of the reflector or the projection lenses, whereby a horizontal array of the three profile lines appears in the front cover, providing the headlamp with a good uniformity of design.

6 Claims, 4 Drawing Sheets

VEHICULAR HEADLAMP HAVING UNIFORM APPEARANCE

BACKGROUND OF THE INVENTION

The present invention relates to a headlamp for motor vehicles. More particularly, the invention relates to a vehicular headlamp of a type including a reflection-type lamp including a parabolic reflector and a light source, and two projection lamps, each having an elliptic reflector with a light source and a projection lens.

Headlamps may be broadly categorized into two types. In the first type of headlamp, as shown in FIGS. 6 and 7, a reflection lamp A including a parabolic reflector 4 with a light source 3 mounted in front of the reflector 4 is disposed within a lamp chamber defined by a lamp body 1 and a front cover 2. The light from the light source 3 when reflected by the parabolic reflector 4 is formed into a substantially parallel light beam. The parallel light beam is directed forwardly to a light distribution control step area S formed on a front cover 2. The light distribution control step area S distributes the light beam in given directions. In the second type of headlamp, as shown in those figures, a projection lamp B, which includes an elliptic reflector 5 with a light source 3 located near the first focal point of the reflector 5 and a projection lens 6 of which the focal point is coincident with the second focal point, is disposed within a lamp chamber. The projection lens 6 projects light beams in the form of a predetermined light distribution pattern.

The projection lamp B can use a reflector 5 which is smaller than that of the reflection lamp A. Accordingly, the lamp size can be reduced. The projection lamp is capable of projecting a large quantity of light. With these advantages, projection lamps have attracted a great of attention in recent years, and is frequently used for headlamps for motor vehicles.

It is not possible to significantly reduce the size of the reflection lamp A. However, the mirror surface color of the parabolic reflector 4 of such a lamp is splendid and brilliant when the lamp is not lit. Thus, the reflection lamp A has a good appearance. In this respect, the projection lamp A is superior to the projection lamp B.

Another type of headlamp has been proposed which obtains the advantages of both types of headlamps. In this headlamp, the reflection lamp A and the projection lamp B are arranged horizontally (side by side) within a single light chamber, as shown in FIGS. 6 and 7. In these figures, C indicates a clearance lamp of the reflection type including a parabolic reflector 7 and a light source 3a.

In the reflection lamp A, the parallel light beam, reflected by the reflector 4 and guided forwardly, must be transformed into a directive light distribution pattern. To this end, a diffusion step area S is formed in a portion of the front cover 2 corresponding to the parabolic reflector 4. In the projection lamp B, the forwardly directed light beam projected by the projection lens 6 is shaped into a distribution pattern by a light distribution control shade (shade for forming clear cut lines) provided therein. The thus-shaped light beam must pass directly through the front cover. To allow the beam to pass directly, no diffusion step area is formed in the portion of the front cover through which passes the light beam from the projection lamps. That is, this portion of the front cover is plain. As a result, the front cover of the conventional headlamp lacks uniformity in design, and its appearance is not particularly good since the diffusion step area S is locally formed on the front cover surface.

SUMMARY OF THE INVENTION

The present invention has been made in view of the above circumstances, and has an object the provision of a vehicular headlamp which has good uniformity of design of the front cover when viewing the headlamp from the front, and hence a good appearance.

To achieve the above object, there is provided a vehicular headlamp in which a first lamp of the projection type having a light source and a reflector and which is circular when viewed from the front, and second and third lamps of the projection type having light sources, substantially elliptic reflectors, and projection lenses, and which are also circular when viewed from the front, are horizontally arrayed in a lamp body. In accordance with the invention, profile lines, which are circular when viewed from the front, are formed on a transparent front cover assembled over the front opening portion of the lamp body in a state such that the profile lines are located corresponding to the three lamps and match the circumferential profiles of the reflector or the projection lenses, whereby a horizontal array of the three profile lines appears in the front cover, providing the lamp a good uniformity of design.

Three substantially circular profile lines may be formed on the front cover of large, medium and small sizes and horizontally arrayed from the inner side of the vehicle to the outer side, a light distribution step area may be formed in a portion of the front cover located corresponding to the reflection lamp, and step areas, which resemble in design the light distribution step area in the portion located corresponding to the reflection lamp, may be formed around the substantially circular profile lines on the portions of the front cover which are located corresponding to the projection lamps.

An internal cover may be provided between the lamp body and the front cover, the internal cover extending around at least the projection lamp and providing the inside of the lamp a uniform mirrored color and good appearance.

The substantially circular profile line on the front cover located corresponding to the reflector of the projection lamp, and the two circular profile lines located corresponding to the projection lenses of the projection lamps are successively arrayed in the horizontal direction, whereby the headlamp has a uniformity of design.

The substantially uniform step areas may be formed over substantially the whole front cover to further enhance the uniformity of design.

The design uniformity can further be enhanced by the provision of the inner cover since the inner cover provides the inside of the lamp chamber with a uniform mirrored color.

DESCRIPTION OF THE PREFERRED EMBODIMENTS

Preferred embodiments of the present invention now will be described with reference to the attached drawings.

Figure 1:
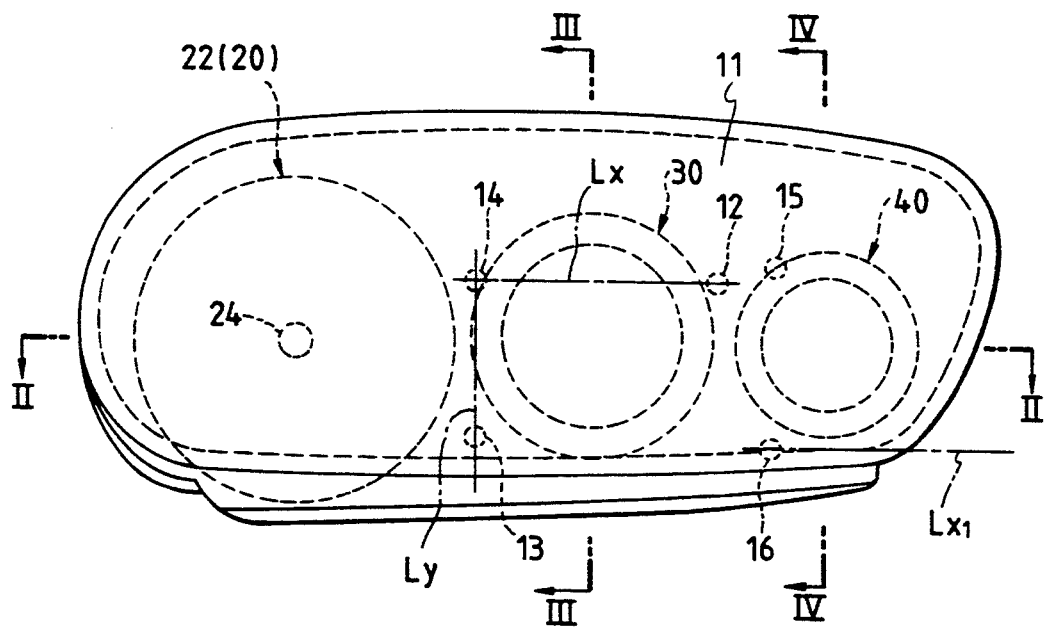
FIG. 1 is a front view showing a vehicular headlamp according to a preferred embodiment of the present invention.
Figure 2:
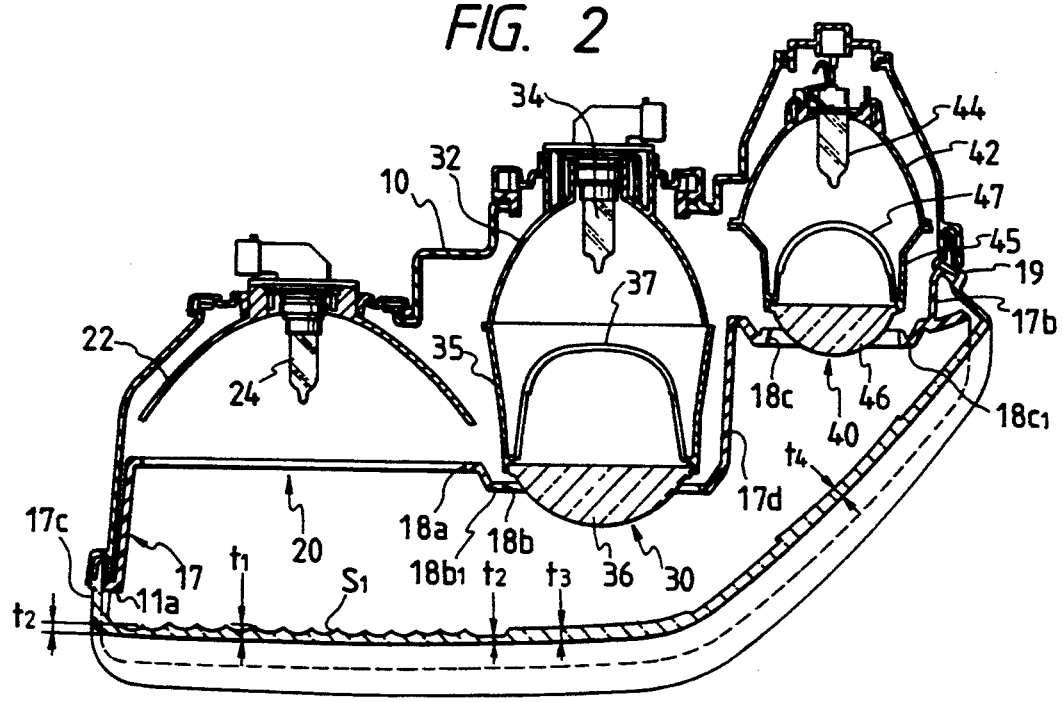
FIG. 2 is a horizontal sectional view of the headlamp (cross-sectional view taken on a line II—II in FIG. 1)
Figure 3:
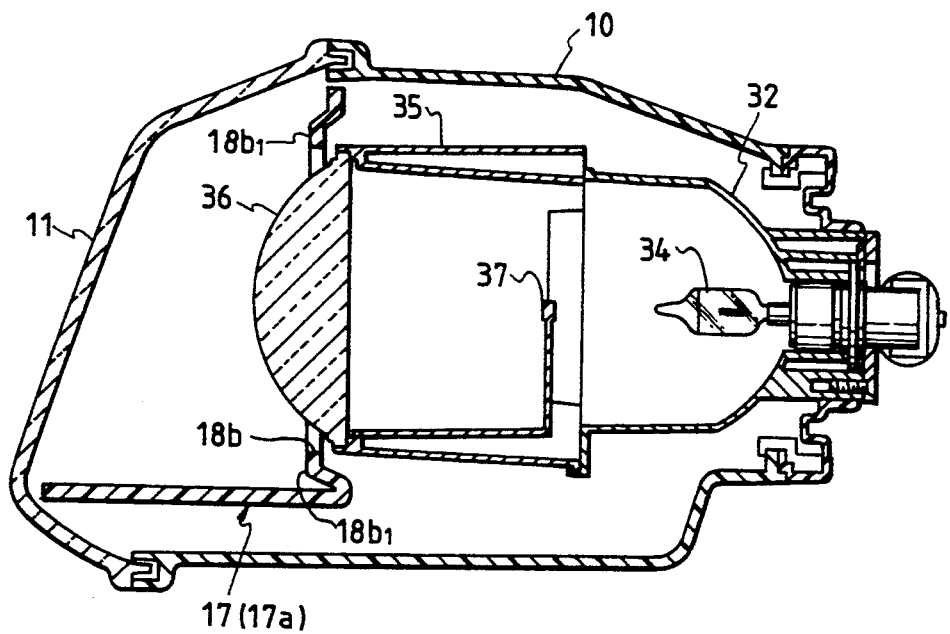
FIG. 3 is a longitudinal sectional view of the headlamp (cross-sectional view taken on a line III—III in FIG. 1)
Figure 4:
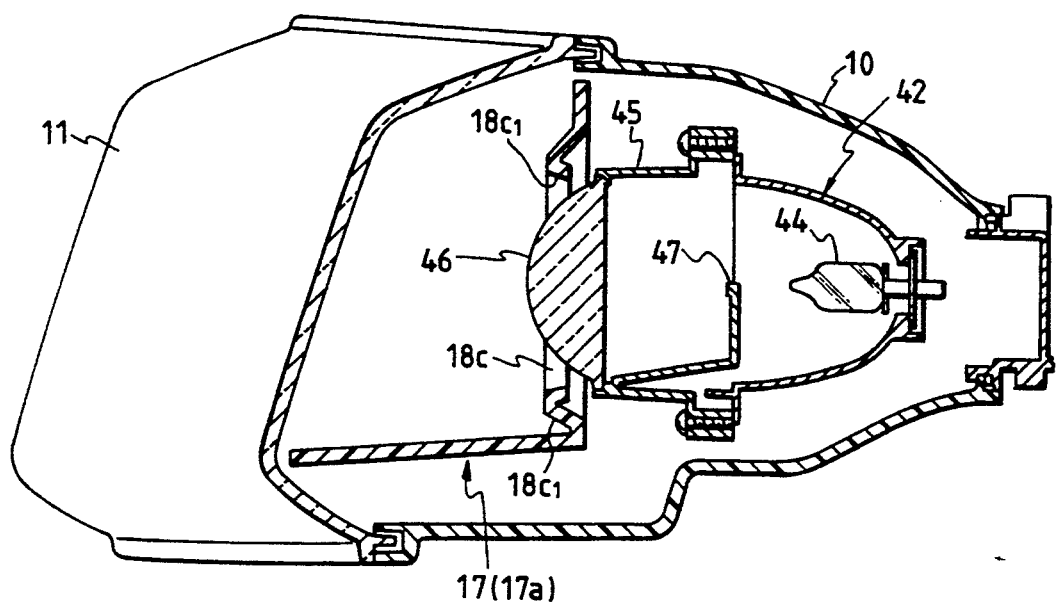
FIG. 4 is a longitudinal sectional view of the headlamp (cross-sectional view taken on line IV—IV in FIG. 1)
Figure 5:
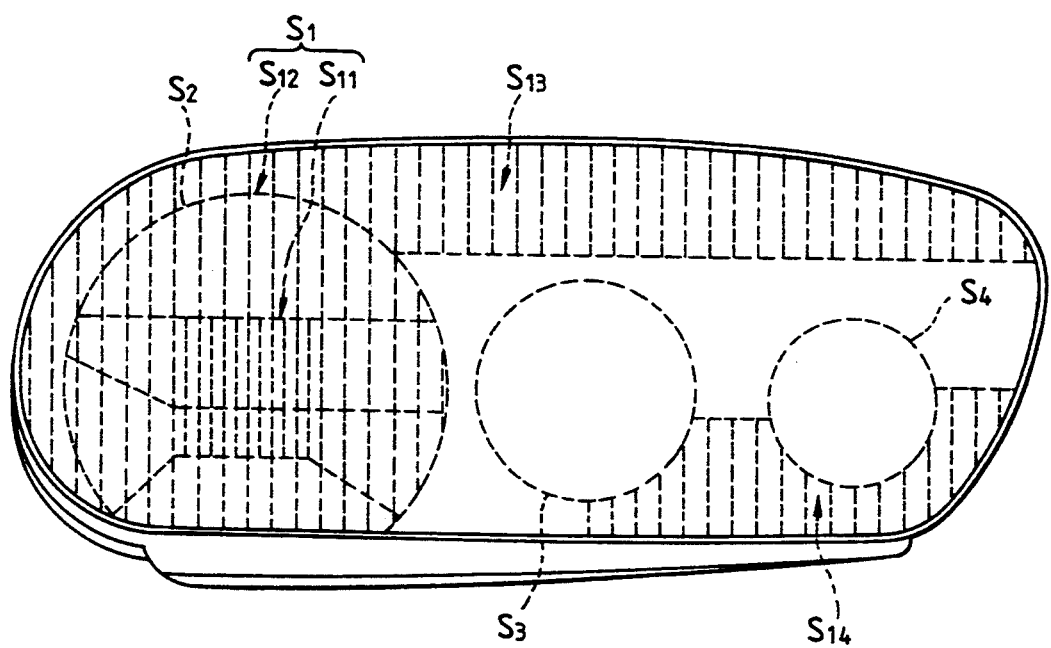
FIG. 5 is a front view of the headlamp, the illustration showing a design appearing on the front cover.
Figure 6:
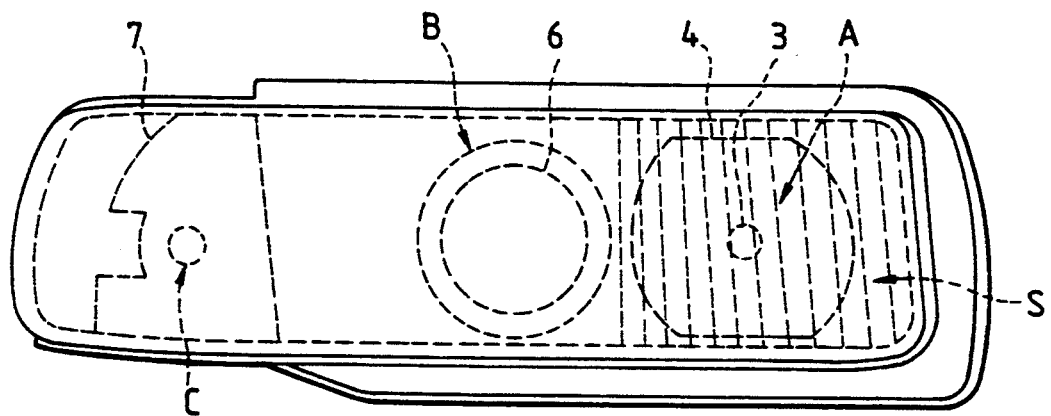
FIG. 6 is a plan view showing a conventional vehicular headlamp.
Figure 7:
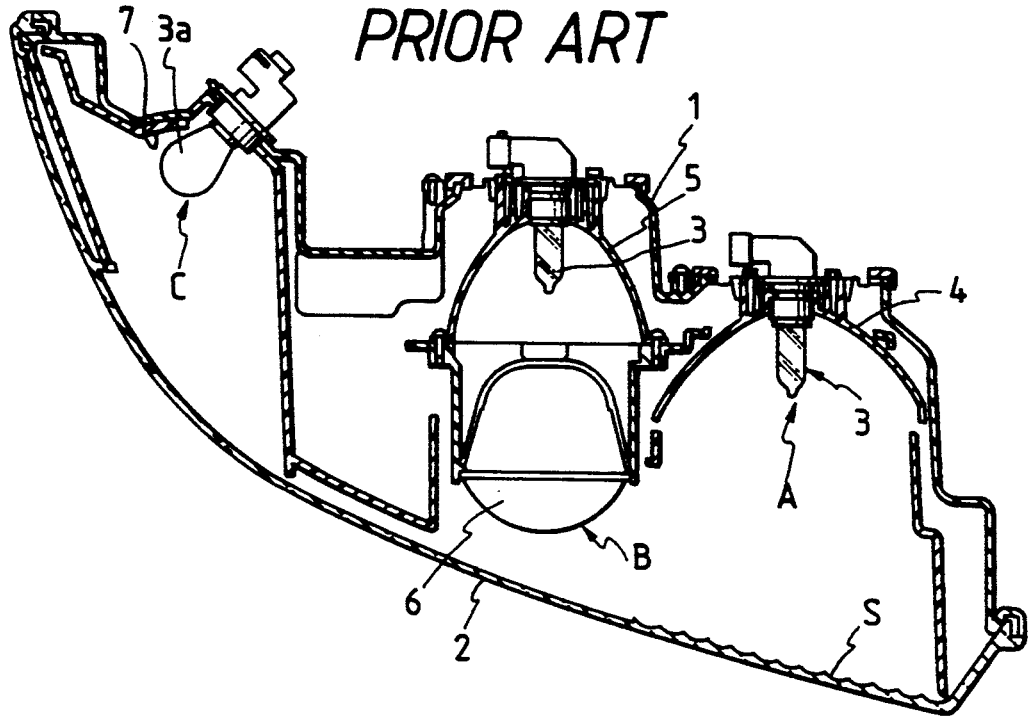
FIG. 7 is a horizontal sectional view showing the headlamp of FIG. 6.

FIGS. 1 through 5 show a preferred embodiment of the present invention, of which FIG. 1 is a front view showing a vehicular headlamp constructed according to a preferred embodiment of the present invention, FIG. 2 is a horizontal sectional view of the headlamp (cross-sectional view taken on a line II—II in FIG. 1), FIG. 3 is a longitudinal sectional view of the headlamp (cross-sectional view taken on a line III—III in FIG. 1), FIG. 4 is longitudinal sectional view of the headlamp (cross-sectional view taken on a line IV—IV in FIG. 1), and FIG. 5 is a front view of the headlamp, the illustration showing a design appearing on the front cover.

In these figures, a lamp body 10 shaped like a container outwardly opens toward the front. A transparent front cover 11 curved rearwardly at the circumferential edge is applied to the front opening of the lamp body 10, thereby forming a lamp chamber outwardly curved from the front side. A reflection-type lamp 20 for forming a normal light beam (first lamp), a projection lamp 30 for forming a passing light beam (second lamp), and a projection type fog lamp 40 (third lamp) are disposed within the lamp chamber.

The reflection lamp 20 is formed of a reflector 22 and a bulb 24 mounted in front of the reflector 22. In this embodiment, the reflector 22, circular when seen from the front, has the shape of a paraboloid of revolution. The light beams that are reflected by the reflector 22 and guided forwardly are horizontally diffused to produce a desired light distribution pattern by cylindrical step area $S_1$ formed in the front cover 11 acting as a light distribution control step area. The configuration of the light distribution control step area (cylindrical step area) $S_1$ formed by the front cover 11 is determined in consideration of the shape of the curved surface of the reflecting surface of the reflector 22. If desired, rather than employ the light distribution control step area, the reflector can be provided with a reflecting surface composed of multiple areas of different curvatures so as to guide the reflecting light beams in the desired directions.

The lamps 30 and 40 are respectively composed of reflectors 32 and 42, bulbs 34 and 44, and projecting lenses 36 and 46. The reflectors 32 and 42 have a substantially elliptic shape. Each of the reflectors 32 and 42 has a smaller opening diameter than the reflector 22 of the reflection lamp 20. The bulbs 34 and 44 are mounted in front of the reflectors 32 and 42. The projecting lenses 36 and 46, circular when viewed from the front, are mounted above the front openings of the reflectors 32 and 42 by means of lens holders 35 and 45.

Reference numerals 37 and 47 designate shades which are integral with the lens holders 35 and 45. The shades are located near the focal positions of the projecting lenses 36 and 46. The shades 37 and 47 intercept portions of the light beams that are reflected by the reflectors 32 and 42 before they reach the projecting lenses 36 and 46, thereby to form desired light distribution patterns. When the lamps 20 and 30 are lit simultaneously, the distribution patterns formed by these lamps are composed into a normal light beam. When the lamp 30 alone is lit, a passing light beam is formed. Where the normal light beam is formed by lighting only the reflection lamp 20, the projection lamp 30 is used only for forming the passing beam.

The projection lamp 30 is supported so as to be tiltable with respect to the lamp body 10 by means of one ball joint 14 and two aiming screws 12 and 13 that extend forwardly and are rotatably supported by the rear wall of the lamp body 10. The projection lamp 30 is tiltable about the vertical axis $L_y$ and the horizontal axis $L_x$ through rotation of the aiming screws 12 and 13, thereby tilting the optical axis of the projection lamp 30 horizontally and vertically. The fog lamp 40 is supported so as to be tiltable with respect to the lamp body 10 by means of a ball joint 16 and an aiming screw 15 that extends forwardly and is rotatably supported by the rear wall of the lamp body 10. The fog lamp 40 is tiltable only about the horizontal axis $L_{x1}$, so that it is possible to tilt the optical axis of the fog lamp 40 only vertically.

An inner cover 17 is provided inside the front opening of the lamp body 10 having circular openings 18a, 18b and 18c that are located at positions corresponding to the reflector 22 of the reflection lamp 20 and receive the projecting lenses 36 and 46 of the lamps 30 and 40. The obverse side of the inner cover 17, like the reflector 22, is coated with aluminum using a deposition process (mirror processed). The outer edge of the inner cover 17 is profiled so as to fit the front opening of the lamp body 10. The lower part (lower edge) 17a of the inner cover 17 located under the circular openings 18a, 18b and 18c is extended horizontally and forwardly to a location near the front cover 11. The inner cover 17 conceals the peripheral regions of the lamps 20, 30, and 40, and also provides a good appearance to the light chamber so that it has an unbroken mirrored appearance. A rear extended part 17b is rearwardly extended from the right end part of the inner cover as viewed from the front, and is fixed to the leg of the front cover 11 by means of a screw 19. A side extended part 17c is extended outwardly from the left end part of the inner cover 17. The side extended part 17c is firmly sandwiched between the front end of the inner wall of a seal groove and the stepped part 11a.

Aluminum is vapor deposited over the entire obverse side of the inner cover 17 as stated above. The obverse side of the inner cover 17 except the ridges $18b_1$ and $18c_1$, shaped like rings as viewed from the front and forwardly protruded from the circumferential edges of the circular openings 18b and 18c located corresponding to the lamps 30 and 40, are entirely smoke colored. Accordingly, the whole inner cover 17 has a deep appearance. Specifically, the ridges $18b_1$ and $18c_1$ within which projection lenses 36 and 46 are located and which are open to view are not smoke coated. Accordingly, a large quantity of light is reflected by the ridges $18b_1$ and $18c_1$. Because of this, the ridges appear to protrude forwardly. A small quantity of light is reflected by the remaining smoke-coated portion (portion of the inner cover 17 except the ridges $18b_1$ and $18c_1$), so that the remaining portion has a deep appearance. Thus, the headlamp has an overall deep appearance when viewed through the front cover 11.

As mentioned above, a cylindrical step area $S_1$ acting as a light distribution control step area for diffusing horizontally distributed light emitted from the lamp into a directive light distribution pattern is formed in the portion of the reverse side of the front cover 11 which corresponds to the reflection lamp 20. A circular profile line $S_2$ as a projection profile of the reflector 22 when viewed in the direction of the optical axis is further formed on the portion corresponding of the reflection lamp 20. The circular profile line $S_2$ is defined by a stepped line ($t_1$–$t_2$) formed along the boundary between the circular area of thickness $t_1$ of the front cover located corresponding to the reflector 22 and peripheral portion (circular area and the peripheral portion) of thickness $t_2$. The thickness $t_1$ is greater than the thickness $t_2$.

The light reflected by the reflector 22 passes through the area enclosed by the circular profile line $S_2$. A cylindrical step area $S_{11}$ in the area enclosed by the circular profile line $S_2$ has the function of horizontally diffusing the light passing through the front cover 11 to form a directive light distribution pattern.

Profile lines $S_3$ and $S_4$, circular when viewed from the front, are formed on portions of the rear side of the front cover 11. The profile lines $S_3$ and $S_4$ are formed by projecting the circular shapes of the projecting lenses 36 and 46 in the direction of the optical axis. The profile lines $S_3$ and $S_4$, like the profile line $S_1$, are also defined by stepped lines formed (along the boundary between the circular areas of the front cover and the peripheral region) by selecting the thicknesses $t_3$ and $t_4$ of the circular areas to be thicker than the thickness $t_2$ of the peripheral portion. The areas enclosed by the profile lines $S_3$ and $S_4$, not having the step areas, are plain areas allowing light emitted by the projecting lenses. 36 and 46 to pass directly therethrough. Since the front cover 11 is tilted upward and sideward, the plain areas looks like elliptic shapes slantingly extending to the side when the plain areas enclosed by the profile lines $S_3$ and $S_4$ are viewed from the side. This gives an original and unique impression.

Cylindrical step areas $S_{13}$ and $S_{14}$ are also formed in the upper portion and the right lower portion on the rear side of the front cover 11, except the above-mentioned circular plain portions, which are optically key portions through which the light emitted by the lamps 30 and 40 passes. Cylindrical step areas $S_{12}$, $S_{13}$ and $S_{14}$ formed outside the profile lines $S_2$, $S_3$ and $S_4$ contribute little to the light distribution of the headlamp, but these step areas are very important in providing a uniform design on the front cover 11.

The profile line $S_2$ formed on the front cover 11 has the configuration of a large circle matching the reflector 22. The profile lines $S_3$ and $S_4$ located adjacent the profile line $S_2$ have the configuration of circles matching the projecting lenses 36 and 46 of the lamps 30 and 40. When seen from the front of the vehicle, these three circles are horizontally arrayed in a state such that the circle of largest diameter is located on the inner side of the vehicle, the circle of smallest diameter is located on the outside, and the circle of middle diameter is located therebetween. The linear array of the circles provides a unique and uniform design of the headlamp.

In the embodiment described above, the stepped lines that are formed by varying the thickness of the front cover 11 are used for defining the profile lines $S_2$, $S_3$ and $S_4$. Lines marked in the glass, printed lines, or the like may be used for the same purpose, in lieu of the stepped lines.

As may be seen from the foregoing description, in the vehicular headlamp according to the present invention, a substantially circular profile line located corresponding to the reflector of the reflection lamp, and two additional circular profile lines located corresponding to the projection lenses of the projection lamps, these three profile lines being formed on the front cover, are horizontally arrayed. The horizontal array of these circular profile lines provides a uniform and pleasing appearance of the headlamp.

The design uniformity may be further enhanced by the provision of steps substantially uniformly distributed over most of the surface of the front cover.

The design uniformity may be still further improved by the use of the inner cover since the inner cover makes it appear that the inside of the lamp chamber has a uniform mirrored appearance.

What is claimed is:

1. A vehicular headlamp comprising: a lamp body, a first lamp of a reflection type comprising a light source and a parabolic reflector and circular in shape when seen from the front of the headlamp, and second and third lamps of projection type, each of said second and third lamps comprising a light source, a substantially elliptic reflector, and a projection lens circular in shape when viewed from the front of the headlamp, said first, second and third lamps being horizontally arrayed within said lamp body, a transparent front cover disposed over a front opening in said lamp body, first, second and third profile lines, circular when viewed from the front, being formed on said front cover at positions corresponding respectively to said first, second and third lamps and respectively matching in configuration circumferential profiles of said reflector said projection lenses of said second and third lamps, whereby a horizontal array of said three profile lines appears on said front cover.

2. The headlamp according to claim 1, wherein said first, second and third profile lines are of respective large, medium and small sizes, and are horizontally arrayed in the stated order from an inner side of a vehicle on which said headlamp is to be mounted to an outer side thereof.

3. The headlamp according to claim 2, wherein a light distribution step area is formed on a portion of said front cover corresponding to said reflection lamp, and a second step area, having a configuration similar to a configuration of said light distribution step area, is formed around said profile lines on said front cover.

4. The headlamp according to claim 3, wherein said profile lines are formed by stepped lines formed along boundaries between respective portions of said front lens corresponding to said reflector and said projection lenses.

5. The headlamp according to claim 1, further comprising an internal cover provided between said lamp body and said front cover, said internal cover extending around at least said projection lamps and having a mirrored surface so that the inside of said lamp has a uniform mirrored appearance.

6. The headlamp according to claim 5, wherein said internal cover has ridge portions surrounding said projection lamp, portions of said inner cover except said ridge portions having a smoke colored coating formed thereon.

* * * * *